UNITED STATES PATENT OFFICE.

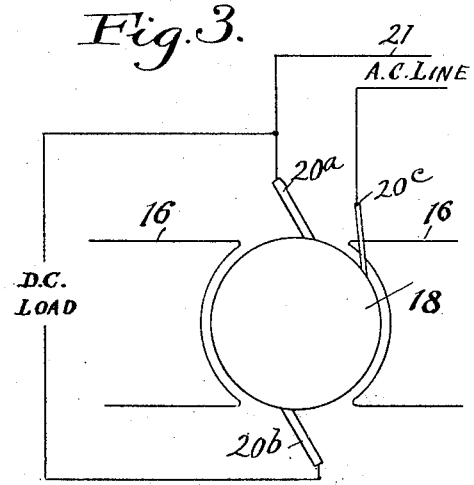
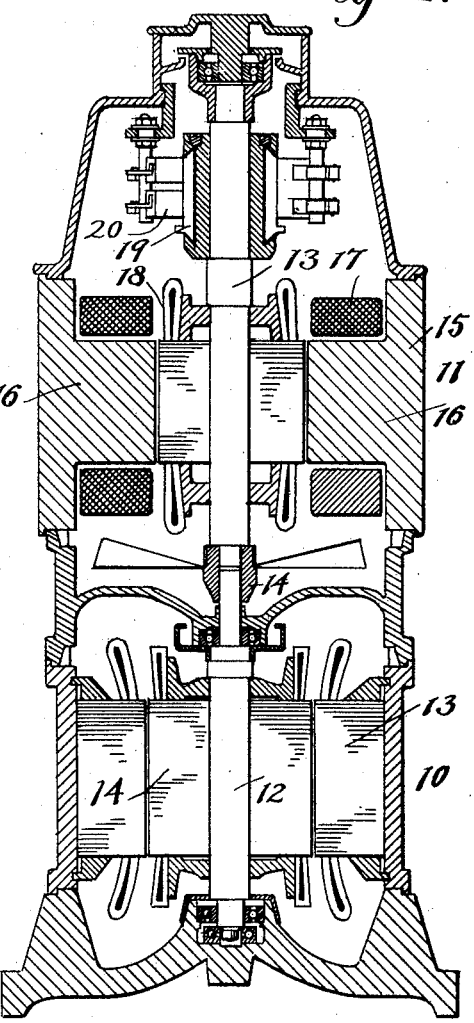
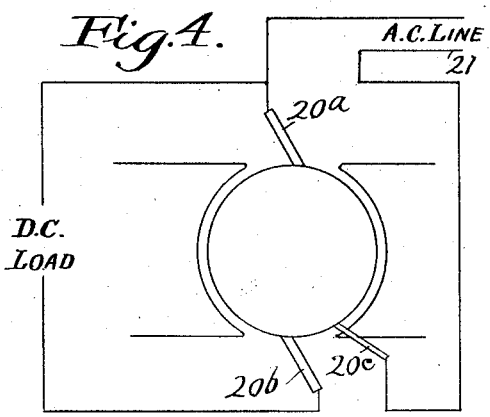
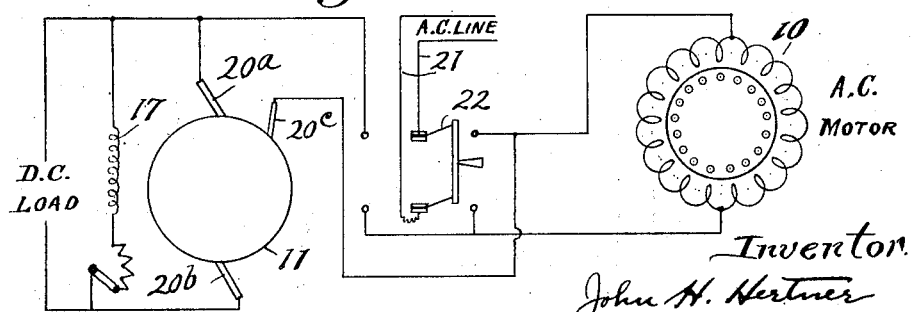

JOHN H. HERTNER, OF CLEVELAND, OHIO, ASSIGNOR, BY MESNE ASSIGNMENTS, TO THE HERTNER ELECTRIC COMPANY, OF CLEVELAND, OHIO, A CORPORATION OF OHIO.

METHOD AND APPARATUS FOR STARTING MOTORS.

1,343,451.      Specification of Letters Patent.    Patented June 15, 1920.

Application filed December 24, 1915. Serial No. 68,508.

*To all whom it may concern:*

Be it known that I, JOHN H. HERTNER, a citizen of the United States, residing at Cleveland, in the county of Cuyahoga and State of Ohio, have invented a certain new and useful Improvement in Methods and Apparatus for Starting Motors, of which the following is a full, clear, and exact description.

This invention relates to a method and means for starting motors which, without special windings or other starting devices are not self-starting. The invention has particular utility in an electrical equipment in the form of a motor-generator set composed of an alternating current motor, particularly a single phase induction motor, and a direct current generator which is coupled to the motor.

The object of the invention is to provide a simple and efficient starting method and means and to eliminate the necessity for especial windings or mechanical devices which increase the size of the motor and are often of a complicated nature.

In carrying out my invention, to start the motor or rather the motor generator set, I utilize the direct current generator temporarily as a motor, and to this end I supply to the generator armature winding alternating current so as to produce an alternating flux which is dissymmetrical in location with respect to the generator field poles, and which generates in the field pole or poles induced currents and a flux. The reaction between the armature and poles produces a torque which quickly starts and speeds up the two machines. In practice I utilize in the direct current generator for starting purpose a third or auxiliary brush and connect the alternating current line to this brush and one of the main brushes, so that the major portion of the alternating current passes through only a portion of the armature winding so disposed as to produce what I have termed the dissymmetrical field.

I prefer also, in thus starting the two machines, to pass the alternating current not only through the portion of the generator armature winding referred to but also through the primary of the motor so that when the machines approach the synchronous or running speed of the motor, the motor acquires torque and pulls into its running speed. By the use of suitable switching mechanism, preferably a double throw switch, the operator can connect the generator armature and motor primary to the alternating current circuit and when the motor has reached its running speed, by reversing the position of the switch, he can disconnect the generator armature leaving the motor only connected to the alternating current supply circuit.

The invention may be further briefly summarized as consisting in certain novel steps of the herein described method and in certain novel combinations and arrangements of parts of the apparatus, which will be described in the specification and set forth in the appended claims.

In the accompanying sheet of drawings wherein I have shown the preferred embodiment of my invention diagrammatically as well as in the structural form that it may assume, Figure 1 is a vertical sectional view through the motor generator set as I prefer to use the same; Fig. 2 is a diagrammatic view illustrating the electrical circuits and the elements and connections which are utilized for starting purposes; Fig. 3 is a diagrammatic view of the generator showing one position of the auxiliary or starting brush; and Fig. 4 is a similar view showing another position of the same for a higher voltage of the alternating current circuit than is utilized with the arrangement shown in Fig. 3.

In the drawings 10 represents the alternating current motor and 11 the direct current generator. In this case the generator is arranged above the motor with their axes vertical and coincident and the shaft 12 of the motor is connected to the shaft 13 of the generator by a coupling 14. The vertical arrangement is preferably employed as it requires less floor space than the horizontal arrangement, altrough it is apparent that so far as the present invention is concerned the machines may be arranged side by side horizontally and may be connected or coupled in some other manner than here shown. It may be here stated that the present invention is employed in practice by me in connection with moving picture apparatus which is frequently employed under conditions which require that as little floor space as possible be occupied by the apparatus.

The motor 10 is preferably a single phase induction motor including a stator 13 carrying a primary winding and a rotor 14 carrying a squirrel-cage or other suitable closed circuit winding. This motor, both as to the stator and rotor, may be of the usual construction.

The generator is provided with a stationary field frame 15 having one or more pairs of solid field poles 16 surrounded by a suitable winding 17. The armature 18 of the generator may be of the usual construction. The commutator 19 is in this case arranged near the upper end of the shaft 13 above the generator and is engaged by main brushes 20, two of which will be employed with a simple two-pole generator. For convenience in the diagrammatic views the brush of one polarity is designated 20$^a$ and the brush of the opposite polarity is designated 20$^b$.

It is a well known fact that a single phase induction motor is not self-starting in the sense that it will not start, as does a polyphase induction motor, without special starting apparatus. It is also well known that many different starting schemes and apparatus have been proposed and used, but most of these special starting devices add serious mechanical complications or include special windings which occupy not a little space in the active sections of the stator or rotor.

For the purpose of avoiding the objections to the prior starting methods and apparatus and to provide a method and apparatus which is efficient and simple mechanically and electrically, I have devised the method and starting means constituting the subject matter of this invention and this will now be explained.

For the purpose of starting the motor or the motor and generator as a unit, I employ the direct current generator temporarily as a special alternating current motor, and to do this I provide on the commutator 19 of the generator an auxiliary or starting brush 20$^c$ which is arranged between the two main brushes or between a pair of the main brushes, in the event that the generator is of the multi-polar type. This auxiliary brush is preferably arranged nearer one of the main brushes than the other, as shown in the diagrammatic views. To start the two machines I have simply to connect the two brushes, i. e., the auxiliary brush and one of the main brushes, to the conductors 21 of the alternating current supply circuit, so that a portion only of the direct current armature winding carries the major portion of the alternating current resulting in a flux which is dissymmetrical with respect to the field poles 16 of the generator. This flux induces in the solid field poles alternating currents which set up an alternating flux, and this flux and the flux produced by the current in the armature winding have a repellent action producing a torque which causes rotation of the armature. The generator and motor are thus started and their speed will accelerate rapidly and if permitted would exceed the synchronous speed of the motor, and, in fact, would accelerate to the point where the combined friction of the two machines balanced the torque produced in the generator used as a motor in the manner above explained. However, I prefer to pass the alternating current through the primary of the induction motor also with the two windings in series, and I prefer also to provide switching means for disconnecting the armature winding from the alternating current circuit when the motor acquires torque and approximate synchronous speed is reached. In practice I utilize for this purpose a double throw switch 22 which is connected to the conductors 21 of the alternating current supply circuit and which, when thrown to one position, i. e., the left hand position, as viewed in Fig. 2, connects the alternating current circuit to the auxiliary brush and one of the main brushes of the generator and also to the primary of the induction motor with the motor and the armature winding in series; and when thrown to the opposite position, i. e., the right hand position, as viewed in Fig. 2, disconnects the generator armature winding from the alternating circuit but connects the latter simply to the primary of the induction motor.

When it is desired to start the apparatus the operator throws the switch to the starting position and when the speed of the two units is accelerated to a point such that it approaches synchronous speed the motor acquires torque and pulls into its running speed with a difference in tone that indicates to the operator when to shift the switch from the starting to the running position. As soon as the motor pulls into the running speed the operator will shift the switch to the running position. The auxiliary brush then becomes an idle brush until it is desired to again start the apparatus.

The operator will ordinarily throw the switch as soon as the motor pulls into its running speed, but it is not absolutely necessary that it be thrown at that time, for when the near synchronous speed is reached and the motor acquires torque the current drops off to an amount equal to the current consumed by an idle single phase induction motor. The unit may be allowed to run in this manner indefinitely, the torque capacity of the single phase motor being in control and much superior to that of the direct current generator employed as a motor in the manner above explained. In other words, if the generator were started as a motor without at the same time being connected to the primary of the induction motor it would, like a direct current series motor, accelerate until the combined friction balanced the torque. When, however, it is started with the armature winding connected in series with the primary of the motor, the speed will not exceed the running speed of the induction motor.

In starting the apparatus in the manner above explained it is immaterial whether the alternating current circuit is connected to the auxiliary brush and the adjacent main brush or the relatively remote main brush, for in either event an alternating flux is produced in the armature which is dissymmetrical with respect to the field poles of the generator and which will cause the alternating current to be induced in the pole or poles. I prefer, however, to arrange the auxiliary brush adjacent the main brush 20$^a$ and to connect the alternating current circuit to these two brushes as shown in Fig. 3 when 110 volt alternating current lighting circuit is available, but when a 220 volt circuit is to be used I prefer to arrange the auxiliary brush adjacent the opposite main brush as shown in Fig. 4, and to connect the alternating current circuit to the same pair of brushes as before but now spanning a greater number of commutator bars and a greater section of the armature winding, as shown in Fig. 4. It will be understood, of course, that if the alternating current circuit were connected between brushes 20$^c$ and 20$^b$ arranged as shown in Fig. 3, or between the same brushes arranged as shown in Fig. 4, the motor would start just as effectively as when the alternating current circuit is connected to brushes 20$^a$ and 20$^c$, but it would run in the opposite direction.

While I have shown the preferred way of using my invention and putting it into practice, I am aware that certain changes can be made and that the principle of the invention can be carried out in different ways or with specifically different forms of apparatus, and I, therefore, aim in my claims to cover all modifications which do not involve a departure from the spirit and scope of my invention in its broadest aspect.

Having thus described my invention, what I claim is:—

1. The method of starting an alternating current motor coupled to a direct current generator, the latter having an armature winding and a field winding normally excited by current generated in the armature, which comprises starting the generator as a repulsion motor by supplying alternating current dissymmetrically to the armature winding only of the generator, and disconnecting the armature winding from the source of the alternating current when the motor has been brought substantially to its running speed.

2. The method of starting an alternating current induction motor coupled to a direct current generator which comprises simultaneously supplying alternating current to the primary or inducing winding of the motor and to the armature winding of the generator so as to produce in the generator armature a field displaced from the field poles of the generator causing the generator to run as an alternating current repulsion motor, and then disconnecting the generator armature from the alternating current circuit when the motor acquires torque.

3. The method of starting an alternating current motor connected to a direct current generator which comprises passing alternating current in series through the armature winding of the generator and through the primary or inducing winding of the motor so that a flux is produced in the armature of the generator dissymmetrical with respect to the poles of the generator causing the generator to run as an alternating current motor, and disconnecting the generator from the alternating current circuit when the motor acquires torque and substantially reaches running speed.

4. A motor generator set comprising an alternating current motor and a direct current generator coupled together, the generator having main commutator brushes and an auxiliary brush between the main brushes, and a switch by which the auxiliary brush and one of the main brushes may be connected to an alternating current circuit.

5. In combination with an alternating current motor and a direct current generator, a means for starting the motor, said means comprising main and auxiliary commutator brushes for the generator, and switching means by which an alternating current supply circuit normally employed for the motor may be connected for starting purposes to the motor and to the auxiliary brush and one of the main brushes of the generator.

6. In combination with an alternating current circuit an alternating current motor and a direct current generator coupled thereto, means for starting the motor, comprising main and auxiliary brushes for the generator and a double throw switch having connections with the auxiliary and one of the main brushes of the generator, with the alternating current supply circuit and with the primary of the motor and adapted when in one position to connect the alternating current circuit to the auxiliary and one of the main brushes of the generator and to the primary or inducing winding of the motor with the latter and a portion of the generator armature winding in series, and when moved to another position to connect the alternating current circuit solely to the primary or inducing winding of the motor.

In testimony whereof I hereunto affix my signature.

JOHN H. HERTNER.